May 21, 1957 A. DAHLSTROM 2,792,799
SEAM WELDING APPARATUS
Filed June 9, 1949 4 Sheets-Sheet 1

INVENTOR:
ALFRED DAHLSTROM.
BY: Donald G. Dalton
his Attorney.

May 21, 1957
A. DAHLSTROM
2,792,799
SEAM WELDING APPARATUS
Filed June 9, 1949
4 Sheets-Sheet 2
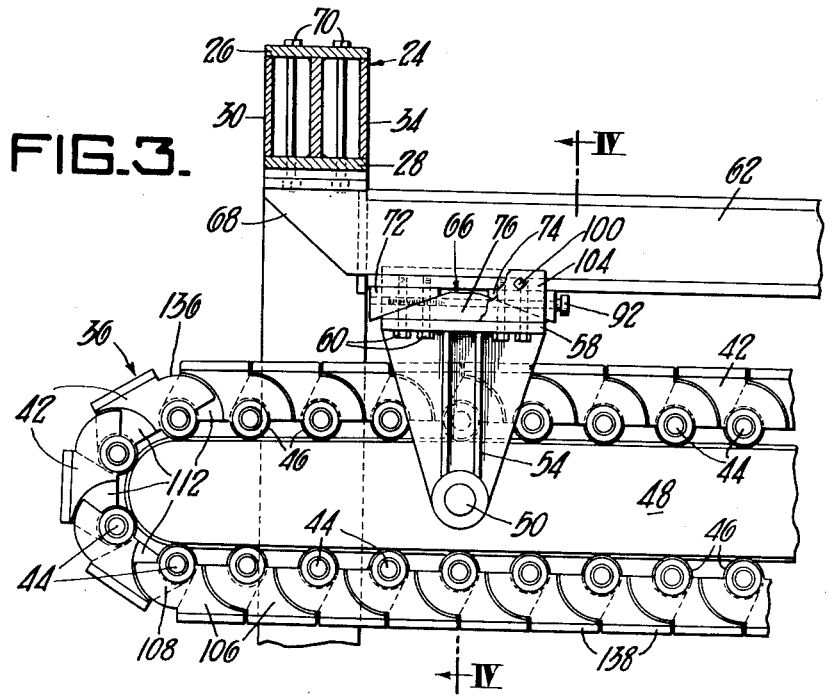
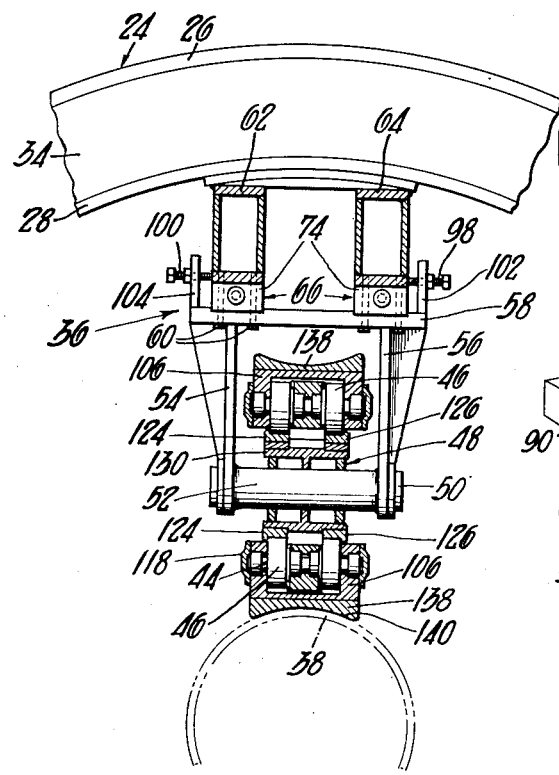
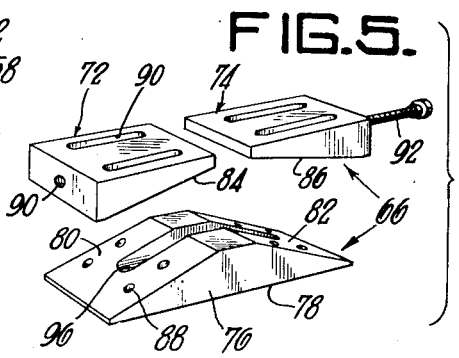
INVENTOR:
ALFRED DAHLSTROM,
BY: Donald G. Dalton
his Attorney.

May 21, 1957

A. DAHLSTROM 2,792,799

SEAM WELDING APPARATUS

Filed June 9, 1949

INVENTOR:
ALFRED DAHLSTROM,
BY Donald G. Dalton
his Attorney.

May 21, 1957
A. DAHLSTROM
2,792,799
SEAM WELDING APPARATUS
Filed June 9, 1949
4 Sheets-Sheet 4
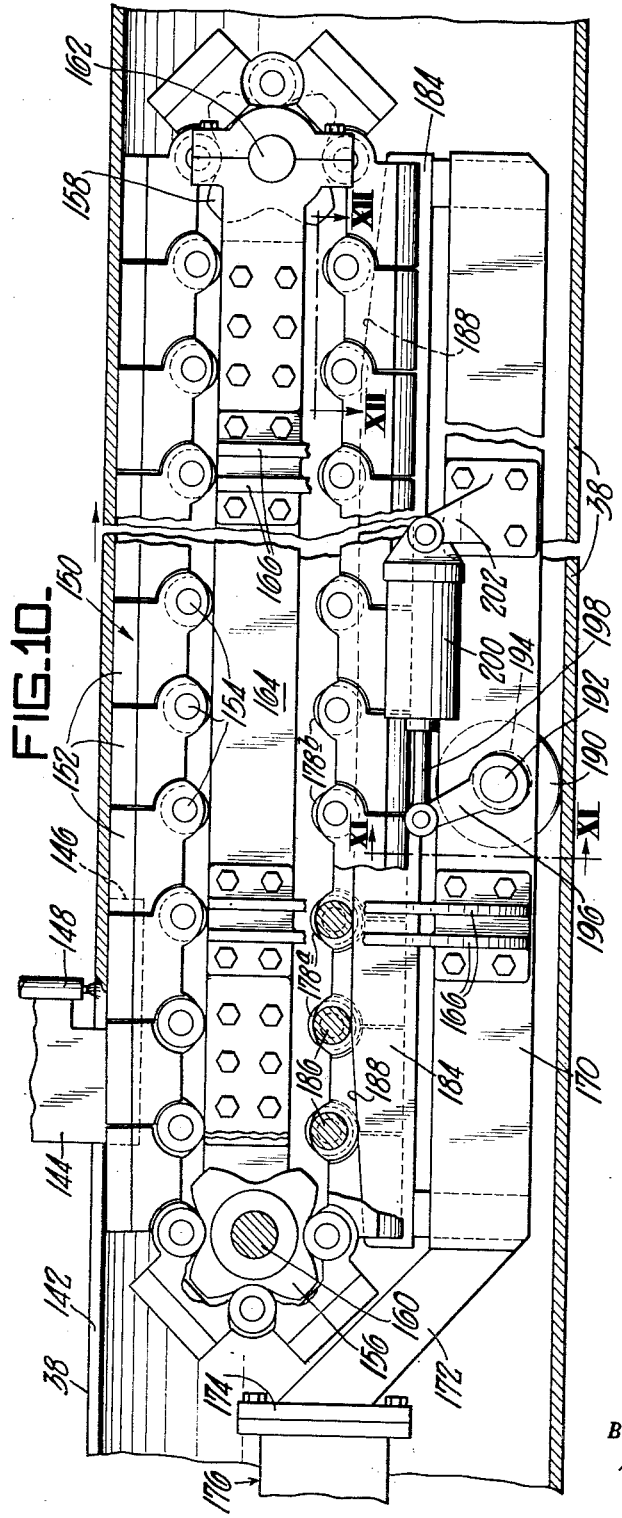
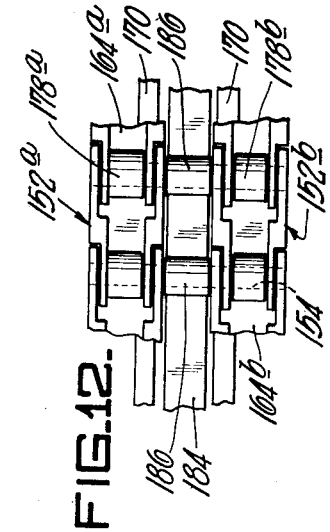
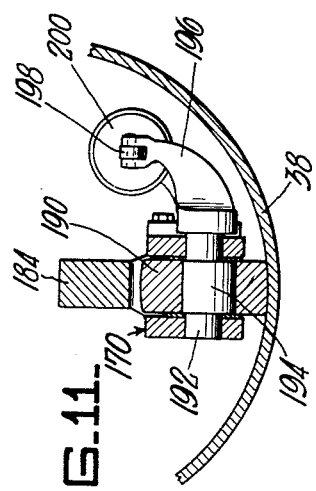
INVENTOR:
ALFRED DAHLSTROM,
BY: Donald G. Dalton
his Attorney.

United States Patent Office 2,792,799
Patented May 21, 1957

2,792,799

SEAM WELDING APPARATUS

Alfred Dahlstrom, Huntington Park, Calif., assignor to United States Steel Corporation, a corporation of New Jersey Application June 9, 1949, Serial No. 98,117

24 Claims. (Cl. 113—59)

This invention relates to seam welding apparatus, and has particular reference to a machine for finally forming and holding a section of rolled steel pipe during and after the welding of a longitudinal seam therealong.

It is the present practice to manufacture large diameter steel pipe (i. e., up to 30" in diameter) by rolling a steel plate of the required thickness into a hollow cylinder, bringing the side edges of the plate into an approximate abutting relation, and welding the abutting edges together. During welding the rolled cylinder is held so that the abutting edges are spaced a slight distance apart leaving a narrow cleft therebetween, and moved past a welding apparatus which fills the cleft between the adjacent edges with weld metal to form a seam joining the two edges.

In the application of this method to the manufacture of steel pipe of large diameter and heavy cross-section, numerous difficulties have been encountered which have not been entirely overcome by the methods and apparatus in current use. It has been found, for example, that the rolled section must be restrained against a tendency to spring outwardly for a sufficient length of time to permit the weld to cool and anneal. If the supporting devices are released too soon, the weld is subjected prematurely to excessive tension loads with the result that the weld cracks or is subjected to undue strains which may lead to failure when the pipe is placed in service.

It has also been found that as the rolled section comes from the rolling mill, it is not in the proper shape or configuration to be welded. For example, the spacing between the adjacent edges which are to be welded together is often not uniform, being wider in the center than near the ends, or conversely, being wider at the ends, so that if the seam is welded with the material shaped as it comes from the rolling mill, the finished pipe will either be barrel- or hourglass-shaped. Furthermore, it often happens that the corners of the plates adjacent the ends of the seam have been bent inwardly or outwardly from the desired cylindrical surface. This bending of the corners interferes with the operation of the welding apparatus; it produces an improper or defective joining at the ends of the pipe section; and it produces an external or internal projection which interferes with the flow of fluid through the pipe or makes it difficult to align the pipe upon installation.

The present invention is directed to the provision of an apparatus which overcomes the above noted disadvantages by functioning in a manner analogous to a forming die. In other words, the machine of this invention provides a tubular die in the form of an elongated passage having a cross-sectional shape which is identical with the desired cross-section of the finished pipe, through which the pipe is moved during the welding operation. The machine exerts sufficient pressure on the rolled section to complete the forming operation, and to bring the pipe to its desired final shape before welding. The machine is capable of bending turned corners back into the desired final position, and is also capable of cold-working to the desired configuration any lips, flanges, bulges or the like which may be present in the rolled section.

The apparatus of the present invention operates to hold the pipe edges immovable during the welding operation and continues to hold the welded pipe in its intended final shape for a sufficient length of time to permit the weld to cool and anneal before the welded seam is subjected to any appreciable stress.

In addition to the foregoing advantageous features, the apparatus of this invention is of a flexible design, permitting it to be readily set for different sizes or styles of pipe.

It is, accordingly, an object of this invention to provide a seam welding apparatus of the character above described which includes means defining a forming die for bringing a rolled pipe section to its final form before welding, and for holding the section in that form and welding the seam as the section is moved through the apparatus.

It is also an object of this invention to provide an apparatus of the character set forth in the preceding paragraph in which the die comprises a plurality of endless chain assemblies, each chain including a series of interconnected links with each link having a suitably contoured surface for engaging and holding the pipe in position, and arranged to move with the pipe as it travels through the apparatus.

It is an additional object of this invention to provide an apparatus of the character described in the preceding paragraphs in which the endless chain assemblies are carried on a supporting structure by adjustable means, permitting the assemblies to be moved in or out to accommodate pipe sections of smaller or larger diameter.

It is a still further object of this invention to provide an apparatus of the character hereinbefore described which includes also an inner endless chain die member for engaging and holding the inner edges of the plate adjacent the seam to be welded.

It is also an object of this invention to provide an apparatus of the character described in the preceding paragraphs in which the inner die member includes a pressure element for engaging the inner surface of the pipe opposite the seam for forcing the die member into pressure engagement with the inner surface of the pipe adjacent the seam, and in which said pressure element is adjustable for varying the force with which said die member engages said inner surface.

It is a still further object of this invention to provide a seam welding apparatus of the character hereinbefore referred to in which the links of said endless chain assemblies are each provided with removable shoes to permit substitution of other shoes having a different contour for use with a pipe of a different size or type.

Other objects and advantages of this invention will be apparent from a consideration of the following specification, when read in connection with the accompanying drawings, wherein:

Figure 3 is a fragmentary sectional view taken substantially along the line III—III of Figure 2 and illustrating the mechanism for supporting one of the endless chain assemblies;

Figure 4 is a fragmentary cross-sectional view taken substantially along the line IV—IV of Figure 3, and illustrating further details of construction of the endless chain supporting mechanisms;

Figure 5 is a perspective view illustrating one form of adjustment mechanism which may be used in connection with the support illustrated in Figures 3 and 4;

Figure 10 is a fragmentary, longitudinal sectional view, illustrating the construction of the inner die member and showing its cooperative relation with the pipe section being processed;

Figure 11 is a fragmentary, cross-sectional view, taken substantially along the line XI—XI of Figure 10, and illustrating the construction of the adjustable means for moving the inner die into engagement with the inner surface of the pipe section being processed; and Figure 12 is a fragmentary plan view taken substantially along the line XII—XII of Figure 10, and illustrating the mode of interconnection of the links comprising the inner die member.

Figure 1:
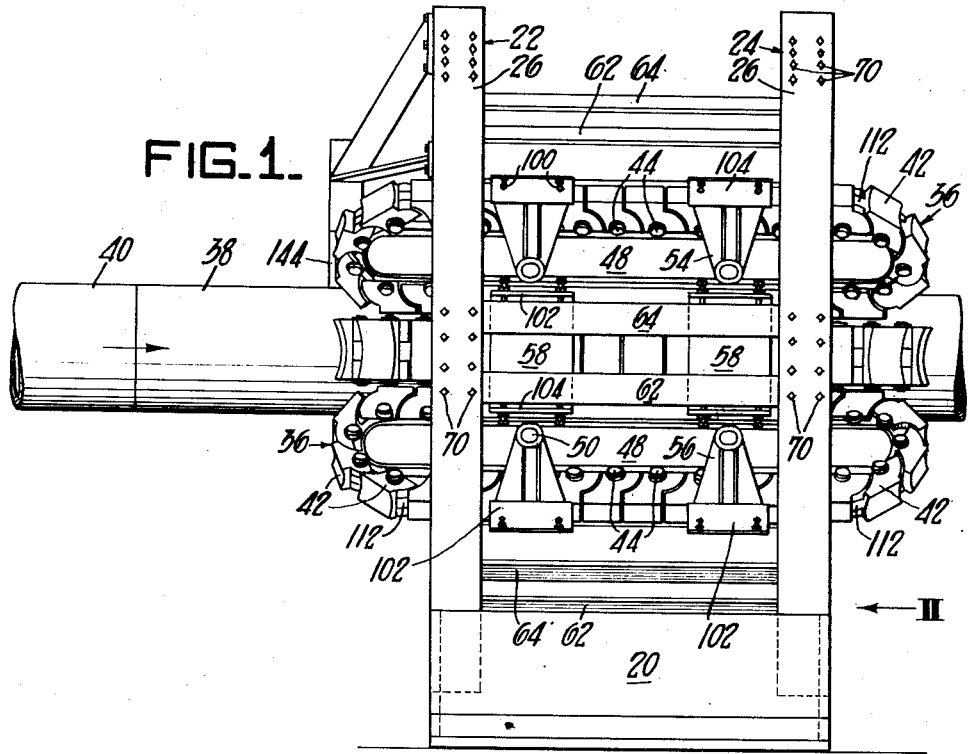
Figure 1 is a side elevational view of a seam welding apparatus constructed in accordance with the preferred embodiment of this invention.
Figure 2:
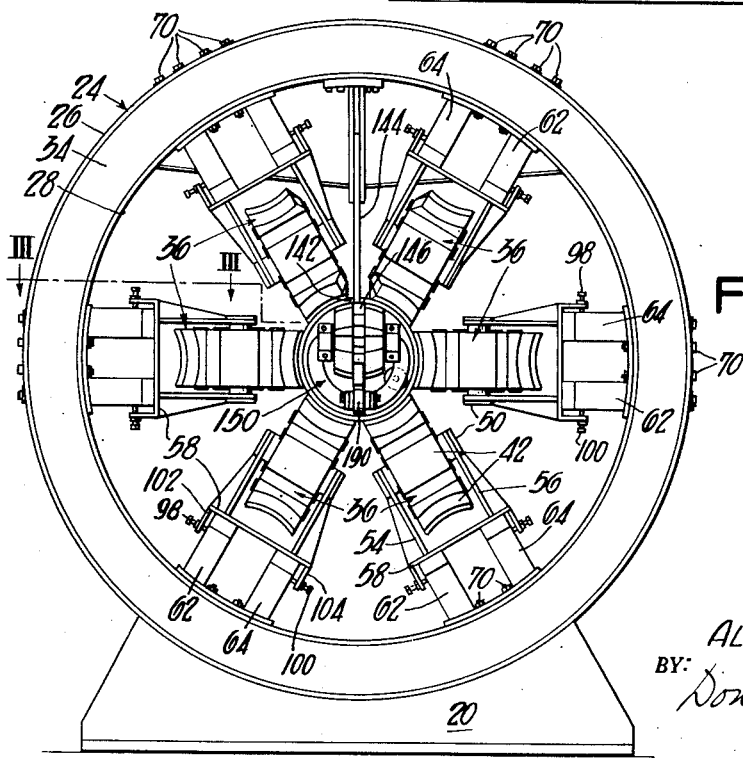
Figure 2 is an end elevational view of the apparatus, taken from the right.

Referring to the drawings, the preferred embodiment of the invention is illustrated in Figures 1 and 2 as comprising a base member 20, upon opposite ends of which are mounted end supporting rings 22 and 24. The base member 20 may, if desired, be cast, but is preferably fabricated of welded structural plate. The end supporting rings 22 and 24 are each preferably formed from structural steel plate with a partitioned box section, as is shown in Figure 3. For example, the end ring 22 may comprise an outer cylindrical ring 26 and a concentrically disposed cylindrical inner ring 28, the annular space between the rings 26 and 28 being bridged by three annular or disc-like plates 30, 32, and 34, the plates 30—34 being suitably joined to the rings 26 and 28 as by welding.

The supporting rings 22 and 24 serve to carry and hold in their proper respective positions a plurality of outer die assemblies indicated generally in Figures 1 and 2 by the reference character 36. These die structures are so positioned as to define a cylindrical passageway extending axially through the machine for receiving a section 38 of pipe to be welded while being processed by the machine. The pipe section 38 is pushed through the machine by means of a following pipe section 40, which is supported and carried by a suitable driving mechanism not shown in the drawings, and forming no part of the present invention. The pipe section 38 is forced through the machine shown in Figure 1 by the force exerted on the following section 40, which in turn follows the section 38 through the machine and is, in turn, pushed by the next following section supplied by the pipe driving mechanism.

As may be seen by reference to Figures 1 through 4, each outer die assembly 36 comprises an endless chain type of mechanism including a plurality of links 42 pivotally joined to each other by pivot shafts 44, and arranged to be supported on rollers 46 mounted on the shafts which ride on a track or guiding member 48. The track members 48 are each provided with two or more pairs of supporting bosses 50 which conveniently are formed by bars 52 passing therethrough and suitably secured thereto as by welding. To the ends of the bars 52, there are secured supporting brackets 54 and 56 which are mounted upon a common base plate 58. The base plate 58 is secured by bolts 60 to a pair of supporting beams 62 and 64, adjustment means 66 being interposed between the base plate 58 and the inner surface of the beams 62 and 64. The construction and operation of the adjusting means 66 is described hereinafter.

The beams 62 and 64 are preferably of box section, as shown, and are fabricated from structural steel plate. They are suitably attached to end brackets 68 (Figure 3) which are formed and adapted to engage the inner surface of the supporting rings 22 and 24, to which they are firmly secured by bolts 70. The rings 22 and 24 and the several pairs of beams 62 and 64 thus constitute a fixed, rigid cylindrical cage.

The support structure just described is shown in Figures 3 and 4 as arranged for the largest diameter of pipe 38 to be processed by the machine. However, since the outside diameter of a pipe of given inside diameter is subject to variation depending upon the wall thickness thereof, it is necessary to provide for a small adjustment of the outer die assemblies 36. To this end, the invention incorporates the adjustment means 66 which, as shown in Figure 5, may comprise a pair of spacing wedge members 72 and 74, adapted to cooperate with a single trapezoidal base member 76. The member 76 provides a plane inner surface 78 which is engaged by the outer surface of the base plate 58, and a pair of oppositely inclined surfaces 80 and 82, adapted to cooperate with similarly inclined surfaces 84 and 86 formed on the inner surface of the wedge member 72 and 74.

The base member 76 is held in a fixed position on the base plate 58 by the bolts 60, which pass through suitable holes 88 provided in the member 76.

The wedge members 72 and 74 are longitudinally slotted, as shown at 90, to admit the bolts 60 and permit the members 72 and 74 to be moved toward and away from each other. This movement of the members 72 and 74 is effected by means of an adjusting screw 92 which passes through a suitable clearance hole in the member 74 and is threaded into a tapped hole 90 in the member 72. The adjusting screw 92 also passes through a suitable longitudinal slot 96 formed in the upper surface of the lower member 76.

By loosening the bolts 60 and suitably manipulating the adjusting screws 92, the members 72 and 74 may be moved toward or away from each other to shift the base plate 58 and brackets 54 and 56 radially of rings 22 and 24. When the desired adjustment is obtained, the device may be locked in position by retightening the bolts 60.

In the event it is desired to set the machine for a smaller diameter of pipe, as for example, to change the machine setting from a 30-inch pipe to a 26-inch pipe, a suitable single steel block of the required thickness may be interposed between the adjustment means 66 and the supporting beams 62 and 64. Such a spacer block is preferably clamped in position by a pair of clamping screws 98 and 100 threaded into suitably tapped openings provided in brackets 102 and 104 welded as shown in Figure 4 to the base plate 58.

By the use of the spacer blocks just mentioned, the outer die assemblies 36 may be moved in or out in accordance with changes in nominal pipe size. The provision of the adjustment means 66 provides for a final adjustment of the positions of the outer die assemblies 36 to accommodate the variations in outside diameter resulting from the use of different thicknesses of material in the rolled pipe section.

Figure 6:
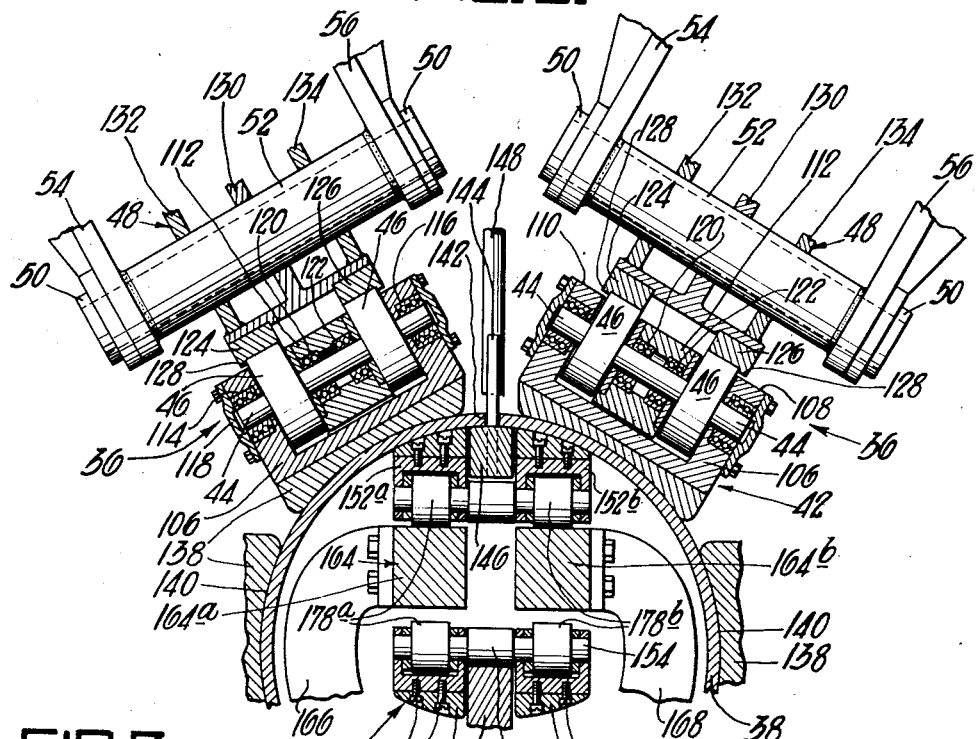
Figure 6 is an enlarged, fragmentary cross-sectional view through the machine shown in Figures 1 and 2, illustrating the cooperative relation between the inner and outer die members and the pipe section being processed by the machine.

As is best shown in Figures 3 and 6, each of the links 42 of the endless chain assembly 36 comprises a block of steel 106 which is slotted at one end to provide a pair of arms 108 and 110. The opposite end of the block 106 is recessed on each side to provide a tongue 112 which is received between the arms 108 and 110 of the next adjacent link. The arms 108 and 110 are pivotally joined to the tongue 112 by means of the aforementioned pivot shaft 44. The shaft 44 is rotatably supported in bearings 114 and 116 suitably secured as by cap members 118 in the arms 108 and 110, and in a pair of bearings 120 and 122, mounted in the tongue 112. The shaft 44 also has the rollers 46 keyed thereto. They are respectively disposed between each of the arms 108, 110 and the tongue 112.

The rollers 46 travel on rails 124 and 126, which are carefully machined and aligned to accurately guide the links 42 as they move along the track member 48. The rails 124 and 126 are preferably provided with flanges 128 which engage the sides of the rollers 46 to provide a lateral restraint and guide the rollers during their movement along the rails. The rails 124 and 126 are suitably secured to the track member 48 which may conveniently be fabricated from an I-beam 130 which has outer plates 132 and 134 extended between the flange edges and secured thereto as by welding.

The tongue 112 and the arms 108, 110 are provided with an arcuate outer boundary surface 136, as shown in Figure 3, this arcuate surface being concentric with the axis of the pivot shaft 44 so that the arms 108, 110 fit loosely in the recessed sides of the tongue 112 to present a substantially smooth and unbroken side surface on the chain assembly while permitting the individual links to pivot with respect to one another as when the chain returns around the ends of the track.

Each of the steel blocks 106 forming the links 42 is provided with a detachable face block or shoe 138. The shoes 138 are secured to the bodies 106 of the links by bolts or other suitable securing devices, and each is provided with a pipe-engaging surface 140 shaped to conform to the curvature of the pipe of the given nominal size with which the shoe is intended to be used.

It will be understood that the machine is provided with a number of complete sets of shoes 138, the shoes of each set differing from the shoes of the other sets in the radius of curvature of the surface 140, so that by substituting shoes of one set for the shoes of another, the outer die assemblies may be given a surface conforming to the desired diameter of the pipe to be processed by the machine.

Figure 7:
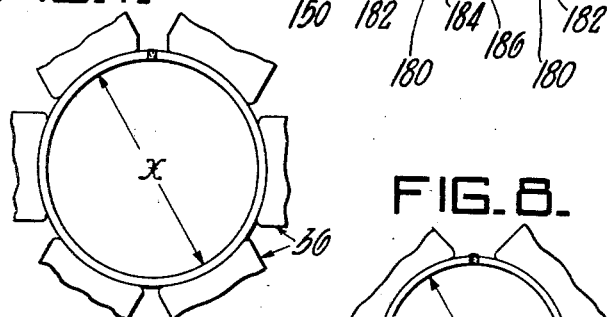
Figure 7 is a diagrammatic view, illustrating one setup of the machine for processing a relatively large diameter pipe section.
Figure 8:
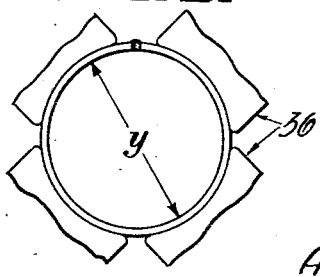
Figure 8 is a diagrammatic view, similar to Figure 7, but illustrating the arrangement of parts which may be employed when processing a pipe section of intermediate diameter.
Figure 9:
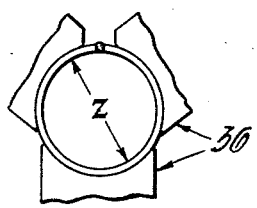
Figure 9 is a diagrammatic view, similar to Figures 7 and 8, but illustrating the arrangement of parts which may be used for processing a pipe section of relatively small diameter.

As is represented in Figure 7, it is preferred to employ six of the outer die assemblies 36 for forming and processing the largest size of pipe which the machine is adapted to handle. In reducing to an intermediate or smaller size of pipe, the outer die assemblies are moved inwardly toward each other, and under these circumstances, it is desirable to reduce the number of the outer die assemblies from six to four for an intermediate size of pipe as is represented in Figure 8, and to further reduce the number of die assemblies to three when the machine is used to process the smallest size of pipe. As is also shown in Figures 7 through 9, the shoes 138 are shaped to provide a uniform engagement between the surface 140 of the shoes and the outer surface of the pipe being processed. In changing the machine over from the use of six die assemblies to three (for example, in changing from the setup shown in Figure 7 to that shown in Figure 9), one merely omits or removes alternate outer die assemblies. However, when the machine is set up to employ four of the outer die assemblies, it is desirable to reorient the radial locations of the die assemblies to divide uniformly the circumference of the pipe being processed. This relocation of two of the die assemblies may be accomplished by removal of the attaching bolts 70 and the circumferential shifting of the supporting beams 62 and 64. The end supporting rings 22 and 24 may be provided with suitable holes for receiving the bolts 70 when the beams 62 and 64 are moved to the alternate location.

It is essential that the pipe engaging surface 140 of the shoes shall move uniformly away from the outer surface of the pipe as the individual links 42 begin the return movement around the ends of the track member 48. This result is achieved by selecting the axial lengths of the shoes 138 to be equal to the longitudinal spacing between the pivot shafts 44, and by terminating each of the shoes 138 in a vertical end surface which is perpendicular to the surface of the shoes and which passes through the axis of the pivot shafts 44.

The structure thus far described provides for supporting the pipe section 38 as it is pushed through the machine by the next oncoming section 40. It will be appreciated that the die assemblies 36 engage the outer surface of the pipe with considerable pressure and are so firmly frictionally engaged therewith that the individual links 42 are caused to move with the pipe as the pipe is moved through the machine. This motion of the links with the pipe is permitted since the links are connected together in the form of an endless chain and are free to travel around the track member 48. By suitably machining the guiding surfaces of the rails 124 and 126, the pipe-engaging surfaces of the dies 140 are held within very close tolerances to a position accurately defining the desired outside shape and diameter of the pipe section 38.

As the pipe section 38 enters the seam welding machine of this invention, the adjacent edges of the rolled plate are spaced apart to define a gap 142 (Figure 6). A supporting plate 144 is suitably secured, as is represented in Figure 2, to the end ring 22 and extends through the gap 142 to support within the pipe 38 a backup member 146. The backup member 146 comprises an elongated heavy block of metal adapted to engage the under surface of the pipe on opposite sides of the gap 142 to provide a surface against which the molten weld material may be deposited. The welding electrodes are supported in suitable holders 148, mounted upon and carried by the supporting plate 144. The electrode holders 148 and the mechanism for feeding the electrode material form no part of the present invention and may be of usual and conventional construction.

The welding apparatus is preferably located at or near the entrance end of the apparatus, so that the adjacent edges of the rolled sheet are joined shortly after they have been forced by the die assemblies 36 into their intended final relative positions. The die assemblies 36 continue to hold the pipe to the desired size throughout the passage of the welded section through the machine, so that the welded seam is given ample time to cool and anneal before the holding forces are released to apply any stress thereto.

The apparatus thus far described operates to apply to the rolled section such inwardly directed forces as may be necessary to bring it to the desired final size of the pipe section. Since, in some cases, it is necessary to permanently deform the material or to stress the material beyond the yield point in order to bring the rolled section into conformity with the desired final shape, the machine is preferably designed to exert pressures up to 5,000 pounds per square inch upon the material engaged by the outer die members.

The machine thus far described will apply such forces as may be necessary to displace any parts of the rolled section inwardly to bring them into their desired final position. It oftentimes happens, however, that the plate in the region adjoining the edges of the rolled section is displaced inwardly so that it is necessary to exert outwardly directed forces to bring the wall of the section out to the desired final position. To this end, the machine of the present invention includes an inner die structure or mandrel which is represented generally in Figure 2 by the reference character 150, and shown in detail in Figures 6 and 10–12.

The inner die assembly 150 comprises an endless chain 152 formed of a plurality of links 152a and 152b, joined to each other by pivot shafts 154. The endless chain thus formed passes over a pair of idler sprockets 156 and 158 mounted upon suitable shafts 160 and 162, disposed at opposite ends of an upper trackway 164. As is best shown in Figure 6, the upper trackway 164 comprises a pair of parallel rails 164a and 164b, mounted respectively upon the ends of a plurality of pairs of C-shaped supporting arms 166 and 168. The lower ends of the arms 166 and 168 are secured to a frame including a pair of spaced bars 170.

The bars 170 are connected by a bracket 172 and fastening means 174 to an axially extending tension member 176 which is secured in a manner not shown to the aforementioned driving mechanism which is used to feed the pipe sections 38 and 40 through the seam welding machine of this invention. The tension member 176 serves to hold the bars 170 against axial movement as the pipe section 38 moves through the machine so that the position of the inner die assembly is fixed relative to the outer die assemblies.

As may be seen from Figures 6 and 10, each of the links of chain 152 comprises a pair of bars 152a and 152b, associated respectively with the rails 164a and 164b, and spaced apart a distance sufficient to receive between them the backup bar 146. The pivot shaft 154, which is freely rotatable with respect to the bars 152a and 152b, extends across and interconnects them. This shaft also carries a pair of rollers 178a and 178b which roll upon the upper surface of the rails 164a and 164b, respectively. These rails are carefully machined and aligned so that the links are held in a precise, fixed location relative to the inner surface of the pipe being processed by the machine.

The individual link bars 152a and 152b are shaped similarly to the outer die links 42, hereinbefore described, and, like said outer links, have secured thereto shoes 180 which are shaped to conform to the desired inner contour of the pipe section 38. The shoes 180 are removably attached to the bars 152a and 152b by screws 182, permitting the shoes to be removed and replaced with shoes of a different size and contour when the machine is to be used with a different size of pipe.

The chain 152 serves as an inner die member frictionally engaging the inner surface of the pipe section 38 and is caused to move along with the pipe section as it travels through the machine. When an individual link reaches the end of the upper trackway 164, it turns about the end sprocket 158 and is returned to the beginning of the machine along a lower rail 184 which is suitably mounted upon the lower supporting member 170. The rail 184 is disposed centrally of the device and is engaged by rollers 186 mounted on the pivot shafts 154, and disposed between the bars 152a and 152b. The rail 184 supports the slack side of the endless chain and is provided with downwardly inclined end surfaces 188 to facilitate the passage of the chain over the end thereof and to minimize the possibility of the rollers 186 striking the end of the rail 184.

In order for the inner die structure just described to perform its intended function, it is necessary that the upper trackway 164 be accurately located in its vertical position with respect to the inside diameter of the pipe being processed. This invention accordingly provides a means for adjustably positioning and determining the vertical location of the trackway. The apparatus for accomplishing this result is illustrated in Figures 10 and 11 as comprising a roller 190 which is supported for rotation upon a shaft 192, suitably mounted in the lower supporting member 170. The roller 190 bears against the inner, lower surface of the pipe section 38 to support thereon the entire inner die structure. The shaft 192 includes an eccentrically disposed cylindrical journal portion 194 upon which the roller 190 is rotatably mounted, so that by rotating the shaft 192, the roller 190 may be moved vertically toward and away from the inner surface of the pipe section 38.

Rotation of the shaft 192 is effected by securing to one end of the shaft 192 a crank arm 196 connected by a piston rod 198 to a suitable hydraulic motor 200 and comprising a piston and cylinder. The cylinder is pivotally supported upon a bracket 202.

Application of hydraulic pressure to the motor 200 will effect an angular motion of the crank 196 so as to shift the eccentric 194 and move the roller 190 toward or away from the inner surface of the pipe section 38. This adjustable positioning of the roller 190 with respect to the supporting frame 170 serves to raise or lower the upper trackway 164 relative to the inner surface of the pipe section 38, so as to position the upper surfaces of the inner die shoes 180 as is required by the desired inner contour of the pipe section being processed.

From the foregoing, it will be observed that this invention provides a seam welding apparatus which is characterized by the use of inner and outer die assemblies which serve as forming dies to bring the rolled pipe section to its desired final size and circular shape before welding. Moreover, the structure operates to hold the rolled section in such desired final configuration during the welding operation, and for a sufficient length of time thereafter to allow the weld to cool and anneal before the weld is stressed by the release of the die. The machine described herein is of the continuously operating type and is capable of exerting sufficiently large forces upon the rolled sections to actually cold-work the material and correct such conditions as inwardly turned corners or barrel shaped sections which cause great difficulty in the operation of the welding machines available prior to this invention. A further advantage is the flexible nature of the machine permitting it to be used as desired for welding pipe of varying diameters and varying wall thickness.

While the preferred embodiment of this invention has been shown and described, the same is not to be limited to the details of construction illustrated and described herein, except as defined in the appended claims.

I claim:

1. Pipe-welding apparatus comprising spaced parallel co-axial supporting rings, beams extending between said rings and spaced circumferentially thereof, an elongated track member having rounded ends mounted on each beam parallel to the common axis of said rings and spaced radially thereof, an endless chain traversing the exterior and interior sides of each member, said chains including links each having a block with a working face shaped to fit the circumference of a pipe section, the blocks of the inner runs of the several chains constituting an elongated tubular die adapted to embrace a pipe section throughout substantially its entire circumference.

2. Pipe-welding apparatus comprising spaced parallel co-axial supporting rings, a plurality of elongated track members having rounded ends mounted on said rings and extending therebetween parallel to their common axis but spaced radially therefrom, an endless chain traversing the exterior and interior sides of each member, said chains including links each having a block with a working face shaped to fit the circumference of a pipe section, the blocks of the inner runs of the several chains constituting an elongated tubular die adapted to embrace a pipe section throughout substantially its entire circumference.

3. The apparatus defined by claim 2 characterized by the links of said chain each having a supporting roller riding on said members.

4. In apparatus for welding together the edges of a longitudinal seam cleft in a formed pipe section, an elongated supporting frame adapted to ride on the interior of the pipe section traversing the apparatus, said frame including an elongated track disposed inwardly of said seam cleft and parallel thereto, and a chain traversing said track including links having blocks shaped to fit the interior of the pipe section and adapted to engage and support the cleft edges under the welding pressure.

5. The apparatus defined by claim 4 characterized by a roller mounted on said frame for movement toward and away from it, said roller being adapted to engage the interior of the pipe section and power means on the frame for actuating the roller.

6. The apparatus defined by claim 5 characterized by an eccentric shaft on which said roller is journaled, said power means being adapted to effect partial rotation of said shaft.

7. The apparatus defined by claim 4 characterized by said frame also including a rail spaced from said track and constituting a return way for the chain.

8. The apparatus defined by claim 7 characterized by the links of said chain including spaced outer rollers adapted to travel on said track and a central roller adapted to travel on said rail.

9. The apparatus defined by claim 4 characterized by C-shaped arms extending upwardly from said frame supporting said track.

10. In apparatus for welding together the edges of a longitudinal seam cleft in a formed pipe section, an elongated frame adapted to be embraced by said section, a track of two spaced rails on said frame extending parallel and adjacent to said cleft edges, an endless chain traveling over said track, said chain including links having blocks thereon shaped to fit the interior of the pipe section and adapted to engage and support the cleft edges.

11. The apparatus defined by claim 10 characterized by said blocks being arranged side-by-side in successive pairs, a support extending through said cleft and a back-up bar on said support engaging the interior of the cleft edges between the paths of the blocks of said pairs.

12. Pipe-welding apparatus comprising a plurality of parallel beams spaced circumferentially about a common axis, circular rings spaced along said axis, normal thereto and coaxial therewith, said beams being fixed to said rings, confined thereby and forming therewith a rigid cylindrical cage, brackets spaced along said beams and extending radially inwardly therefrom, elongated guide bars having rounded ends mounted on said brackets parallel to said beams, an endless chain extending lengthwise entirely around each bar and adapted to travel along the interior and outer faces thereof and around said ends, said chains including links each having a block with a working face shaped to fit the circumference of a pipe section, the blocks of the inner runs of the several chains constituting an elongated tubular die adapted to embrace a pipe section throughout substantially its entire circumference.

13. The apparatus defined by claim 12 characterized by said beams being disposed in pairs, bearing plates spaced along and bridging each pair of beams, a pair of said brackets being mounted on each plate.

14. The apparatus defined by claim 13 characterized by means for adjusting said plates transversely of said beams.

15. The apparatus defined by claim 12 characterized by spaced rails on said guide bars and rollers on said chains running on said rails.

16. The apparatus defined by claim 12 characterized by said brackets being disposed in pairs, the brackets of each pair lying in the same plane normal to said axis.

17. The apparatus defined by claim 16 characterized by a bar extending through each pair of brackets and the track member supported thereby.

18. The apparatus defined by claim 12 characterized by means for adjusting said brackets radially of said rings.

19. The apparatus defined by claim 18 characterized by said adjusting means including spacing wedges and means for shifting the wedges relative to the brackets.

20. The apparatus defined by claim 12 characterized by means for adjusting said brackets transversely of said beams.

21. In apparatus for progressively welding together the edges of a longitudinal seam cleft in a formed pipe section, a mandrel for supporting the section interiorly under the pressure required to abut said edges, said mandrel comprising an elongated supporting frame adapted to ride on the interior of a pipe section traversing the apparatus, a lower track extending along said frame, an upper track spaced vertically from the lower track and extending substantially parallel thereto, means on said frame extending outwardly around said lower track and supporting said upper track and an endless roller chain having lower and upper runs engaging said tracks, respectively, said chain including links having blocks shaped to fit the interior of the pipe section and adapted to engage and support said edges under said pressure.

22. The apparatus defined by claim 21 characterized by said upper track comprising spaced parallel rails and said lower track being a single rail in a vertical plane between the rails of the upper track.

23. The apparatus defined by claim 22 characterized by said chain including lateral rollers engaging said upper track and central rollers engaging said lower track.

24. The apparatus defined by claim 21 characterized by said blocks being arranged in spaced rows on the chain, a support extending through said cleft and a back-up bar carried thereby extending between said rows for engagement with the inner surfaces of said edges.

References Cited in the file of this patent

UNITED STATES PATENTS

| Number | Name | Date |
|---|---|---|
| 107,051 | Housel et al. | Sept. 6, 1870 |
| 805,736 | Lindgren | Nov. 28, 1905 |
| 950,626 | Sanford | Mar. 1, 1910 |
| 1,019,043 | Higgin | Mar. 5, 1912 |
| 1,026,789 | Darlington | May 21, 1912 |
| 1,124,755 | Lloyd | Jan. 12, 1915 |
| 1,247,501 | Butcher | Nov. 20, 1917 |
| 1,266,470 | Hosack | May 14, 1918 |
| 1,271,428 | Burns | July 2, 1918 |
| 1,404,830 | Sjobring | Jan. 31, 1922 |
| 1,481,887 | Berg | Jan. 29, 1924 |
| 1,806,954 | Schmitz | May 26, 1931 |
| 1,905,478 | Lutz | Apr. 25, 1933 |
| 1,915,639 | Woofter | June 27, 1933 |
| 1,919,186 | Cooper | July 25, 1933 |
| 1,948,154 | Adams | Feb. 10, 1934 |
| 1,954,679 | Mirafield et al. | Apr. 10, 1934 |
| 1,980,164 | Boyle | Nov. 3, 1934 |
| 1,980,308 | Adams | Nov. 13, 1934 |
| 1,982,415 | Blevins | Nov. 27, 1934 |
| 1,983,930 | Carlsen | Dec. 11, 1934 |
| 1,987,691 | Lincoln | Jan. 15, 1935 |
| 1,997,272 | Adams | Apr. 9, 1935 |
| 2,010,155 | Hull | Aug. 6, 1935 |
| 2,043,020 | Theimer | June 2, 1936 |
| 2,084,889 | Blevins | June 22, 1937 |
| 2,139,771 | Riemenschneider | Dec. 13, 1938 |
| 2,166,776 | Von Hofe et al. | July 18, 1939 |
| 2,205,002 | Tripp | June 18, 1940 |
| 2,240,627 | Riemenschneider | May 6, 1941 |
| 2,268,368 | Anderson | Dec. 30, 1941 |
| 2,272,698 | Garrett | Feb. 10, 1942 |
| 2,408,255 | Elliott | Sept. 24, 1946 |
| 2,438,448 | Morton et al. | Mar. 23, 1948 |
| 2,458,906 | Himmel et al. | Jan. 11, 1949 |
| 2,517,574 | Jones | Aug. 8, 1950 |
| 2,613,303 | Babbitt | Oct. 7, 1952 |